United States Patent [19]

Keller, III et al.

[11] 4,220,175
[45] Sep. 2, 1980

[54] ANTI-SCALD APPARATUS FOR A TUB AND SHOWER SINGLE CONTROL FAUCET

[75] Inventors: Robert J. Keller, III, Richmond, Va.; Brian G. Fox, Dover Center; Benjamin A. Korec, Cambridge, both of Canada

[73] Assignee: Kel-Win Manufacturing Company, Inc., Chester, Va.

[21] Appl. No.: 906,072

[22] Filed: May 15, 1978

[51] Int. Cl.³ .............................. F16K 19/00
[52] U.S. Cl. ..................... 137/454.6; 137/607; 137/630.2; 251/285
[58] Field of Search .............. 137/454.2, 454.6, 607, 137/630.2, 636.1; 251/285

[56] References Cited

U.S. PATENT DOCUMENTS

| | | | |
|---|---|---|---|
| 2,934,091 | 4/1960 | Chapou | 137/607 X |
| 3,011,520 | 12/1961 | Barkelew | 251/285 X |
| 3,559,684 | 2/1971 | Rudewick | 251/285 X |
| 3,812,875 | 5/1974 | Buhler | 137/636.1 X |
| 3,952,764 | 4/1976 | Keller | 137/454.6 X |
| 4,089,347 | 5/1978 | Christo | 251/285 X |

*Primary Examiner*—Robert G. Nilson
*Attorney, Agent, or Firm*—Richard P. Matthews

[57] ABSTRACT

An anti-scald apparatus for a tub and shower single control faucet which incorporates a novel cam and cam follower arrangement on the hot and cold water valve means which permits substantially more than 180 degrees of rotation of the control handle. Adjustable temperature stops provide both a comfort stop for normal use and a safety stop which can be reached only by activation of a release button carried by the faucet handle by means of which the comfort stop may be overridden by continuing the rotation of the handle.

8 Claims, 19 Drawing Figures

ANTI-SCALD APPARATUS FOR A TUB AND SHOWER SINGLE CONTROL FAUCET

This invention relates to an anti-scald apparatus for a tub and shower single control faucet and, more particularly, to such a single control faucet with a handle which may be rotated through substantially more than 180 degrees permitting the deployment of temperature stops with appreciably less criticality per degree of rotation of the control faucet handle.

Heretofore it has been known to utilize a single lever control for tub and shower installations and to rely upon movement of the handle faucet or control lever to blend or mix the outputs of hot and cold water valve members for use in the tub or shower. These installations customarily are limited to 180 degrees or less rotation of the control lever whereby the change of temperature per degree of rotation of the control lever is too high and results in temperature changes which are too abrupt, extremely critical as to the position of the control lever and unsatisfactory to the comfort of the user. In fact, scalding of the user has oftentimes occurred.

In accordance with the present invention, the aforesaid shortcomings and disadvantages of previously known devices are effectively overcome by the inclusion of a novel cam and cam follower arrangement for use in combination with the hot and cold water valve means which permits substantially more than 180 degrees of rotation of the faucet control handle. This not only permits the attainment of a substantially lower change of temperature per degree of rotation of the control handle which accrues to the comfort of the user, but also permits a non-critical positioning of both comfort and safety stops for use in connection with the tub and shower control faucet.

A "comfort" stop as used herein is a preselected temperature or relatively narrow temperature range above which the tub and shower single control faucet cannot be operated without actuation of a release button or control member by the user. Actuation of the release button or control member permits a temporary override of the comfort stop whereby the water temperature may be further increased until the safety stop is engaged.

A "safety" stop as used herein is that maximum preselected temperature, normally set at approximately 115° F. or slightly more so that the temperature will not be at or near the recommended hot water source temperature of 140° to 150° F. Scalding occurs above 115° F., above which water cannot be delivered by the tub and shower control faucet of the present invention. Its position is also adjustable, and will normally be set at the factory or at the time of installation. A safety stop which limits rotation of the control faucet handle to a maximum of about 300 degrees of rotation is possible for the present invention with lesser degrees of rotation being possible depending upon the hot and cold water source temperatures.

In a preferred embodiment of the present invention the hot and cold water valve members are contained in a removable self-contained cartridge and received in a cartridge housing member therefor. The latter has separate tubular inlets for hot and cold water and outlet passageways leading to the tub and shower respectively. The hot and cold water valve means have passageways in fluid communication with the hot and cold tubular inlets of the cartridge housing member and with the passageways leading to the tub and shower.

In addition, each of the hot and cold water valve means are provided with cam follower means which constantly engage cam means preferably mounted on a single control handle faucet means which provides for a predetermined sequence of opening and closing of the hot and cold water valve means so as to obtain a desired mixing or blending thereof. By making the cam tracks concentric with one another the control handle can be rotated through substantially more than 180 degrees. In the disclosed form of the invention, the hot and cold valve means are mounted vertically in side-by-side relationship and the cam track for one of the valves effectively straddles the cam track for the other valve.

The previously defined comfort and safety stops are provided in a slotted ring member which in turn is received in a recess in a cover plate member. The single control handle faucet means not only includes the cam means but also includes an elongated stem member which extends out of the cartridge member and through the cover plate member. A dome-shaped handle is telescoped thereon and frictionally retained on the stem with the aid of a spring member. Substantial tolerances in wall widths and similar adjustments are possible by this construction.

The handle carries an abutment or control member in spring loaded fashion which is selectively engageable with the comfort and safety stops. The abutment or control member is capable of being activated by depressing it so that it will pass by the comfort stop but will not pass the safety stop. As the handle is rotated in the opposite direction the abutment or control member is re-engaged by the comfort stop and cammed to its original position. Finally, the abutment or control member is provided with an aperture to permit the insertion of a tool therethrough so as to permit an adjustment in the location of both the comfort stop and safety stop.

The inherent advantages and improvements of the present invention will become more readily apparent by reference to the detailed description of the invention and by reference to the accompanying drawings in which.

Figure 1:
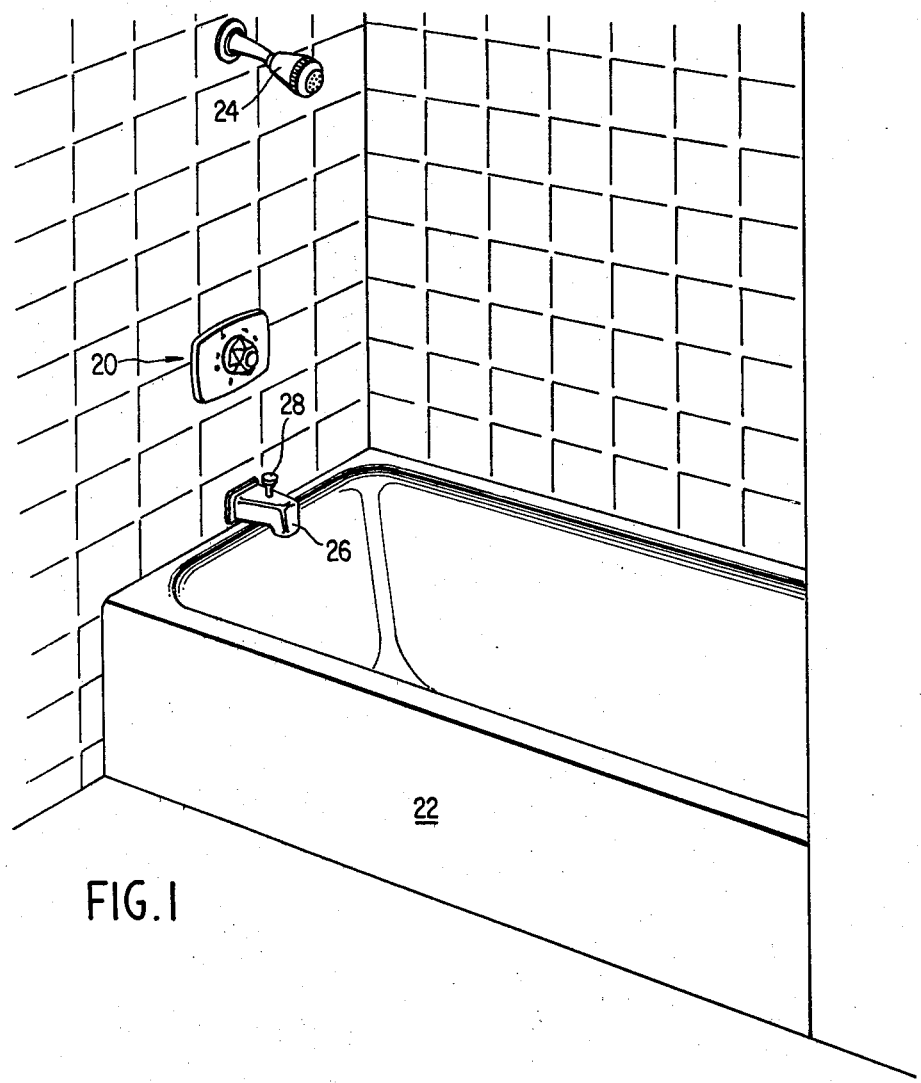
FIG. 1 is a perspective view illustrating a tub and shower installation of the present invention.

Referring now to FIG. 1 of the drawings, a typical installation of the anti-scald apparatus of the present invention is illustrated. In this figure, a single control handle faucet means is indicated generally at 20 installed in a wall adjacent a tub 22 and a shower fixture 24. Faucet 26 directs water into tub 22 and a diverter valve control is illustrated at 28. For purposes of this invention, diverter valve control 28 may be completely conventional.

Figure 2:
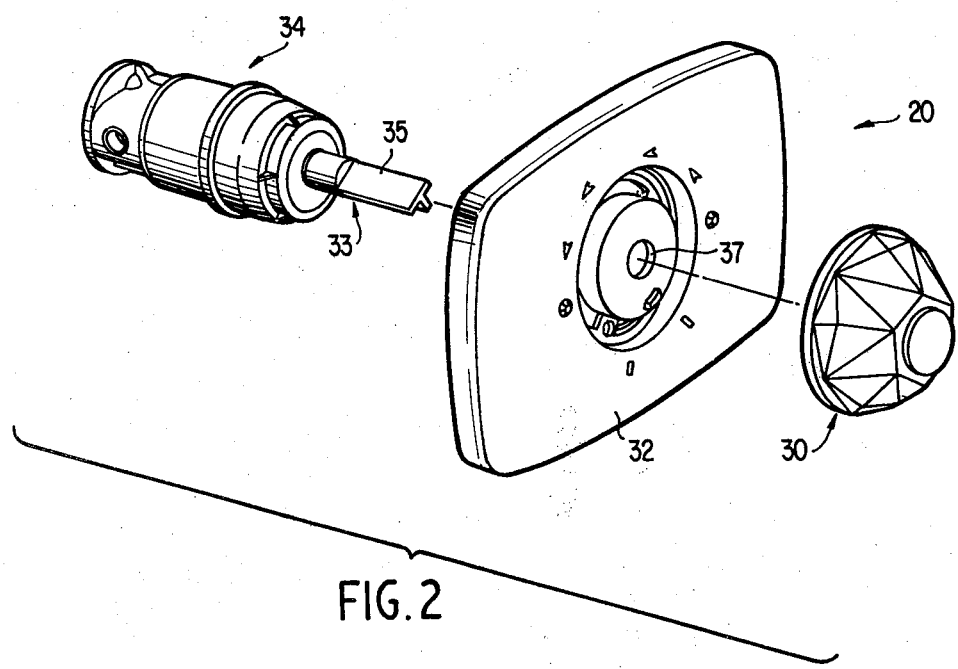
FIG. 2 is an exploded view of a single control unit for the tub and shower appliances of FIG. 1.

In the exploded view of FIG. 2, a handle is indicated generally at 30 spaced from a cover plate 32. A valve cartridge housing is indicated generally at 34 and is provided with an unusually long stem member generally designated 33 having a T-shaped handle receiving portion 35 which is inserted through a central aperture 37 in cover plate 32 when the elements are in the assembled position shown in FIG. 3.

Figure 3:
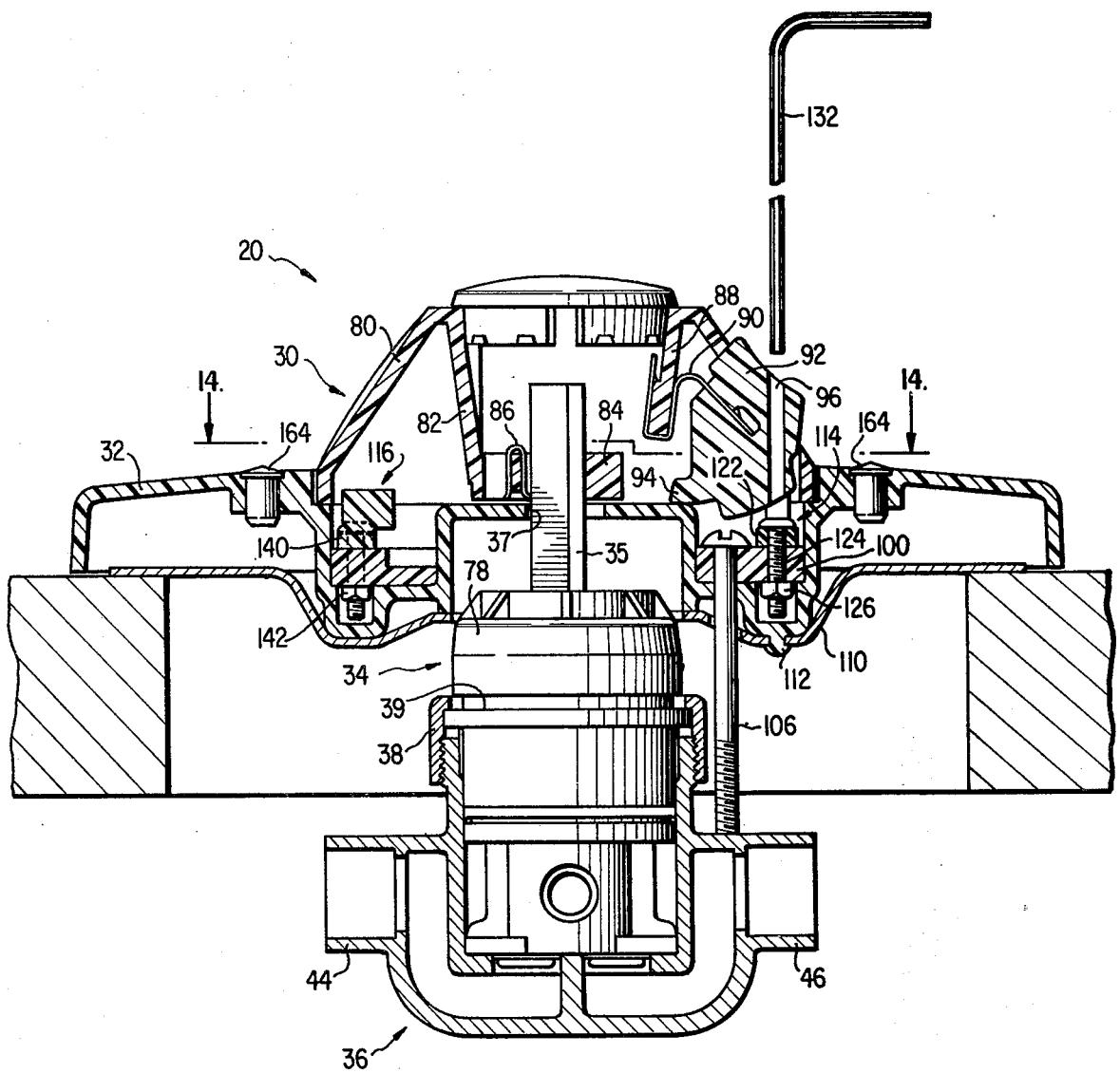
FIG. 3 is an elevation view taken in vertical cross section of the assembled single control unit of FIG. 2.
Figure 4:
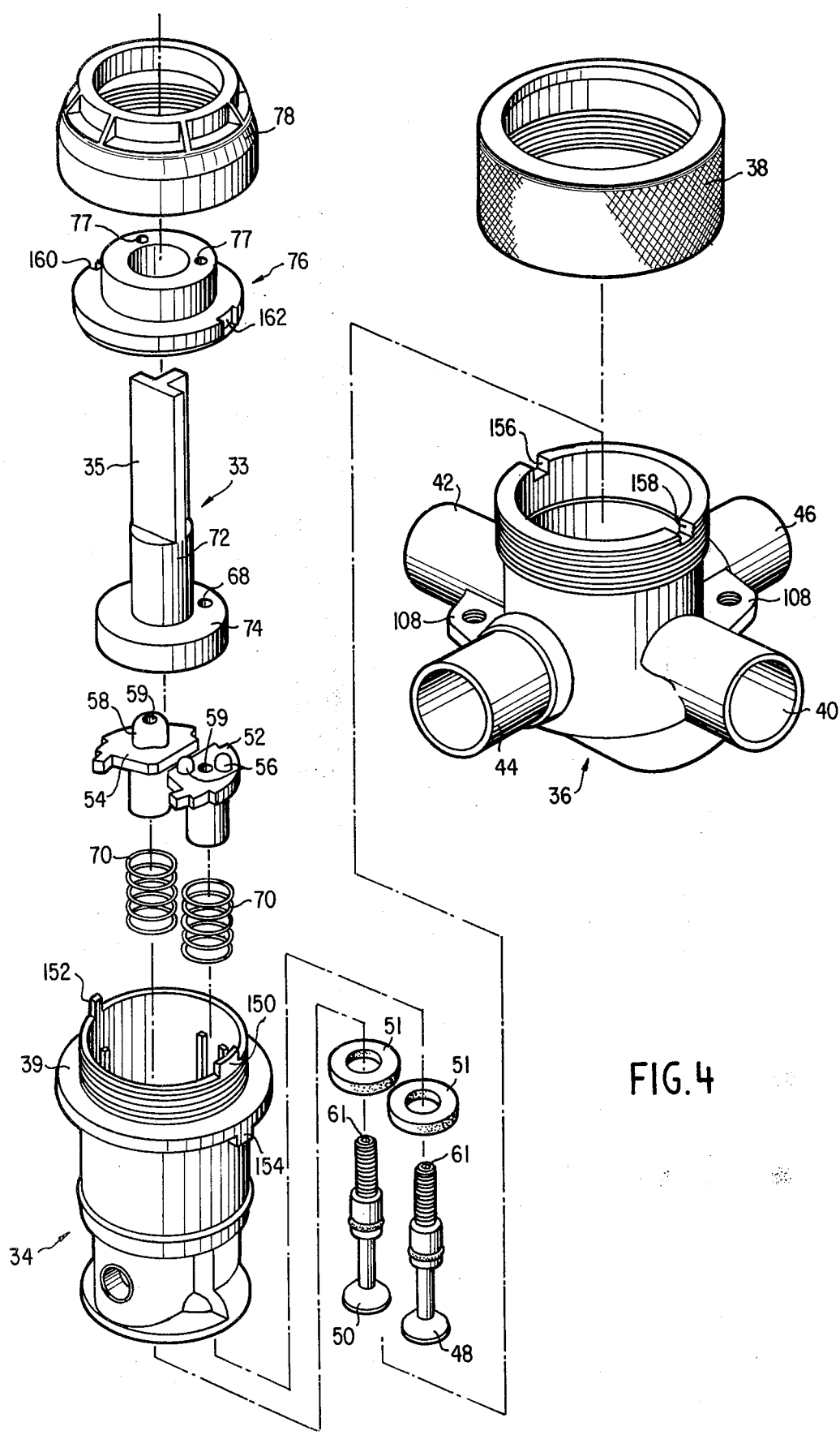
FIG. 4 is an exploded view of the single control unit of FIG. 3.

Referring now more particularly to FIGS. 3 and 4, there is illustrated generally a cartridge housing member 36 into which the valve cartridge 34 is inserted and secured by means of locking nut 38 which has a locking upper lip for engagement with flange 39 of valve cartridge 34 and is threadedly received on the cartridge housing member. The latter is shown in FIG. 4 to have hot and cold water inlet passageways 40, 42 respectively and diagonally opposed tub and shower passageways 44, 46.

Figure 5:
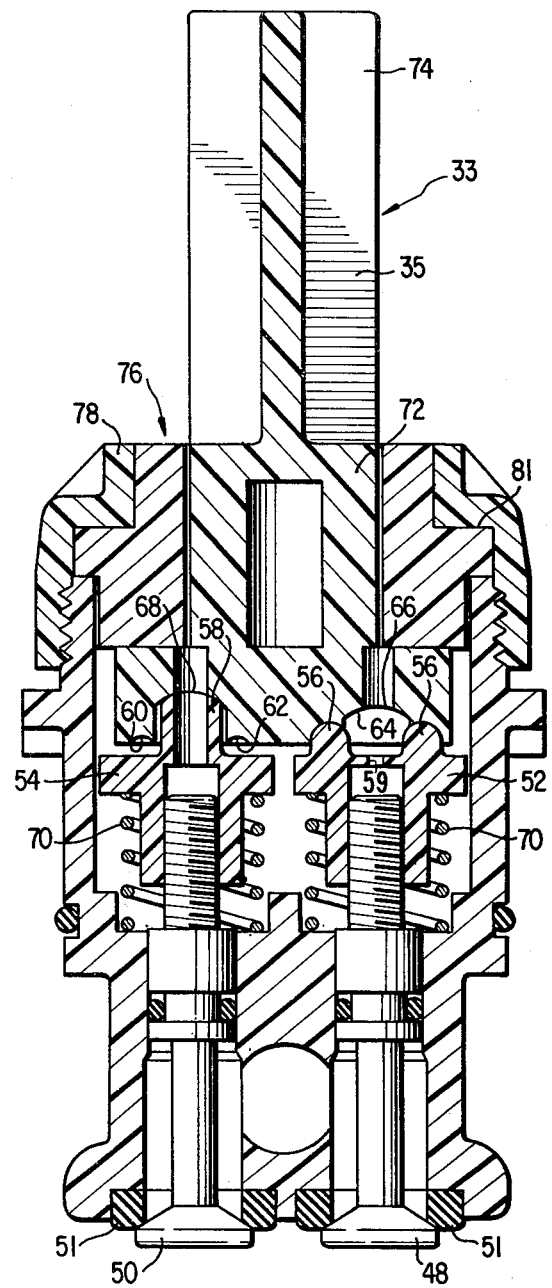
FIG. 5 is an elevational view taken in vertical cross section of an assembled valve cartridge unit showing one position thereof.

Cold water valve means are shown at 48 and hot water valve means are shown at 50 each of which form a seal with their respective seat members 51 as shown in FIG. 5, for example. The stems of the cold and hot valve means 48, 50 carry respective cam follower members 52, 54 the upper planar surfaces of which carry protrusions which constitute cam follower surfaces 56 for the cold water valve means and 58 for the hot water valve means. The cold water cam follower surfaces constitute a pair of protrusions the reasons for which will become evident hereinafter. Each cam follower member 52, 54 is provided with a longitudinally extending aperture 59 for insertion of a tool therethrough, such as an Allen wrench, for insertion into hexagonal apertures in the ends of the stems in cold and hot water valve means 48, 50 so as to adjut the setting of the valve means as desired.

Figure 16:
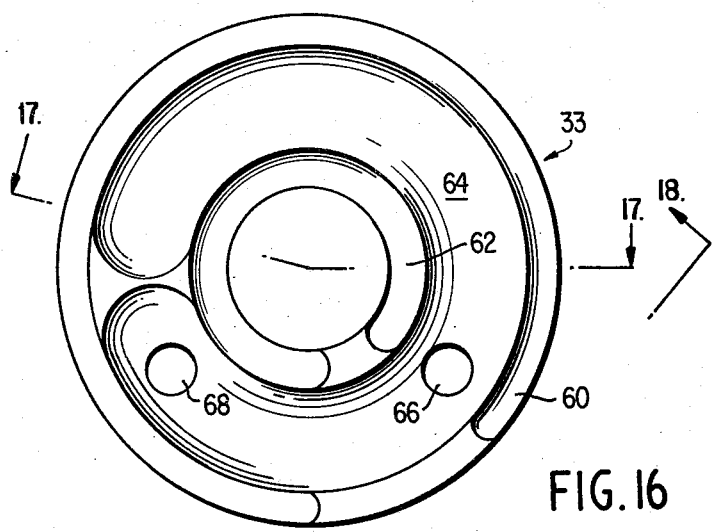
FIG. 16 is a bottom view of the control stem showing concentric camming surfaces.
Figure 17:
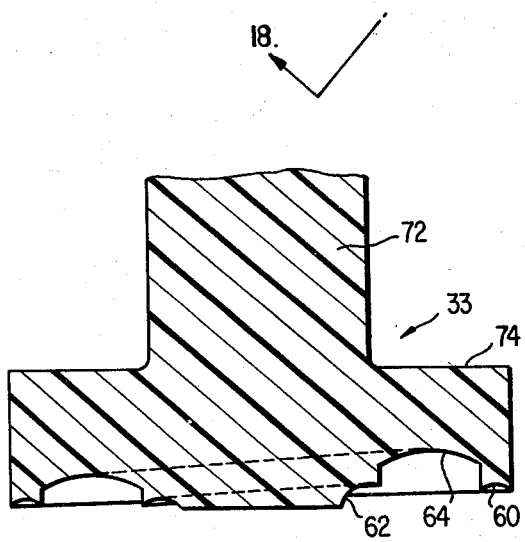
FIG. 17 is a fragmentary elevational view of the control stem taken in vertical cross section along line 17—17 of FIG. 16.
Figure 18:
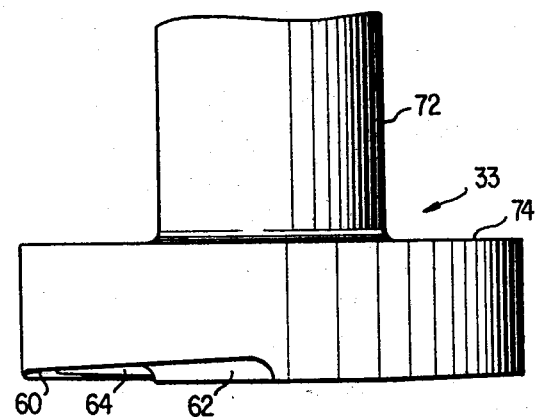
FIG. 18 is a fragmentary elevational view of the control stem as seen from line 18—18 of FIG. 16.
Figure 19:
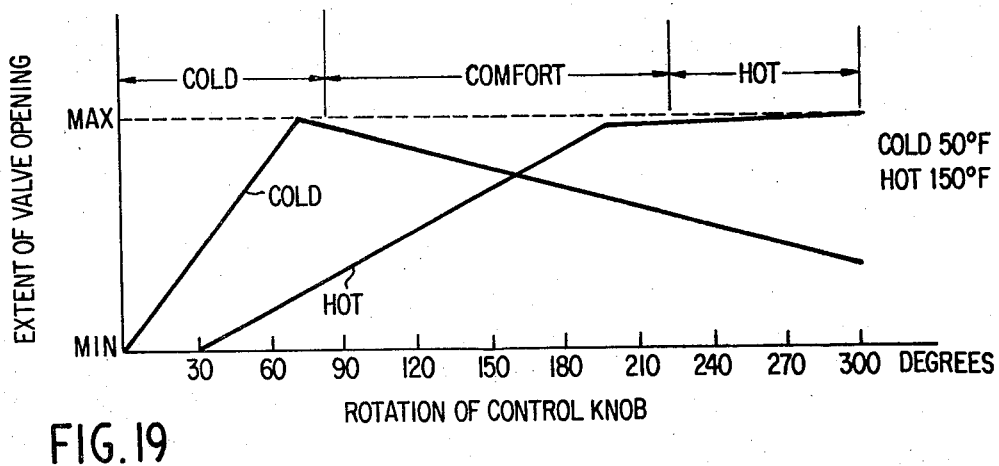
FIG. 19 is a graph showing the amount of hot and cold water passing through the control valves plotted against degrees of rotation of the control knob.

Reference is now made to FIGS. 16–18 for a description of the cam surfaces which are carried on the underside of the stem member 33. As seen best in FIG. 16, the undersurface of stem member 33 has substantially concentric cam track paths 60, 62 which are engaged by the two protrusion-like cam followers 56 on the cold water valve means. Concentric with each of the cam tracks 60, 62 is another cam track 64 which is engaged by the single protrusion cam follower 58 on the hot water valve means. Since the concentric cam tracks are at different elevations and effectively interlaced but without overlapping, it is possible to get substantially more than 180 degrees of rotation for the single control handle as is evident from an inspection of the degrees of rotation possible from the FIG. 16 embodiment. Apertures are provided at 66 and 68 for alignment with the stems in the cold and hot water valve means whereby it becomes possible to set and adjust the valves for their proper sequences of opening and closing in order to obtain a desired mixing thereof such as is schematically illustrated in FIG. 19. In this figure, the extent of valve opening for the hot and cold water is plotted on the ordinate axis and the number of degrees rotation of the control knob is plotted along the abcissas axis. The hot and cold water valve means are being controlled simultaneously in effecting this blending of the valve outlets.

Referring again to FIG. 4, spring members for urging the hot and cold valve members into closed position are illustrated at 70. The stem member 33 is illustrated to have a cylindrical portion 72 intermediate a cam carrying base 74 and the T-shaped handle receiving portion 35. A cartridge cam retainer member is shown generally at 76 having a pair of apertures at 77 to permit the insertion of a valve adjusting tool such as an Allen wrench. Finally, a locking cap member 78 is threadedly secured to the external threads of the valve cartridge 34 as seen best in FIGS. 5-7. When the locking cap member is threadedly secured to the valve cartridge 34 it also engages flange 81 on the cartridge cam retainer member 76 thereby locking it in place against the upper cylindrical surface of the valve cartridge 34.

A handle member 80 is shown in FIG. 3 to have a first downwardly extending rib 82 terminating in a horizontally extending flange 84 which carries a spring 86 to help secure a frictional fit between handle member 80 and the T-shaped section 35 of stem member 33. Handle member 80 carries a second downwardly extending rib 88 having a thickened lower portion for retention of one end of a spring 90 the other end of which is received within an abutment 92 which functions as a control member. Abutment or control member 92 has a rearwardly extending portion 94 which establishes a sliding pivotal relationship with a centrally domed portion of the cover plate 32. In addition, the abutment 92 is provided with a return camming surface 93 and with a tool receiving aperture 96 whereby the stop members to be described hereinafter may be adjusted in their position.

Referring now to FIG. 3 in combination with FIGS. 12–15, the description of both the comfort stop and the safety stop will be given. First of all, a slotted ring member 100 is illustrated received in a substantially circular groove of the cover plate 32. Not only does the slotted ring member 100 have at least one slotted area 102 to receive the stop members, but it also has at least a pair of bosses 104 to receive cover screws or bolts 106 which are received in cooperatively positioned bosses 108 in the cartridge housing member 36 and shown in FIG. 4. Preferably a metallic plate member 110 provides a backup for this assembly so as to avoid cracking or distortion of the slotted ring member 100 as the bolts 106 are drawn tight. It is also possible to provide a heat staking lug as shown at 112 in FIG. 3 to secure the back up plate 110 to the cover plate 32.

A comfort stop is indicated generally at 114 and a safety stop at 116 each as defined previously herein. Comfort stop 114 has a substantially flat leading end face 118 adapted to be engaged by abutment 92 and a rearwardly-inwardly tapering side face 120. Thereby abutment 92 may be urged radially inwardly against the pressure of spring 90 so that the abutment 92 can be made to pass or clear the comfort stop and provide hotter water to either the shower or tub as desired. However, as the handle 30 is rotated on its return to turn the water off, tapering surface 120 engages camming surface 93 of abutment 92 and cams it inwardly until the abutment passes or clears the comfort stop 114 whereby the stop is effective upon subsequent use of the handle 30 to prevent scalding of the user. In other words, the comfort stop 114 is effective on each initial use of the tub and shower control. and is capable of being superseded or overcome by deliberately depressing the abutment or control member 92 so as to permit additional rotation of the handle member 30.

Figure 13:
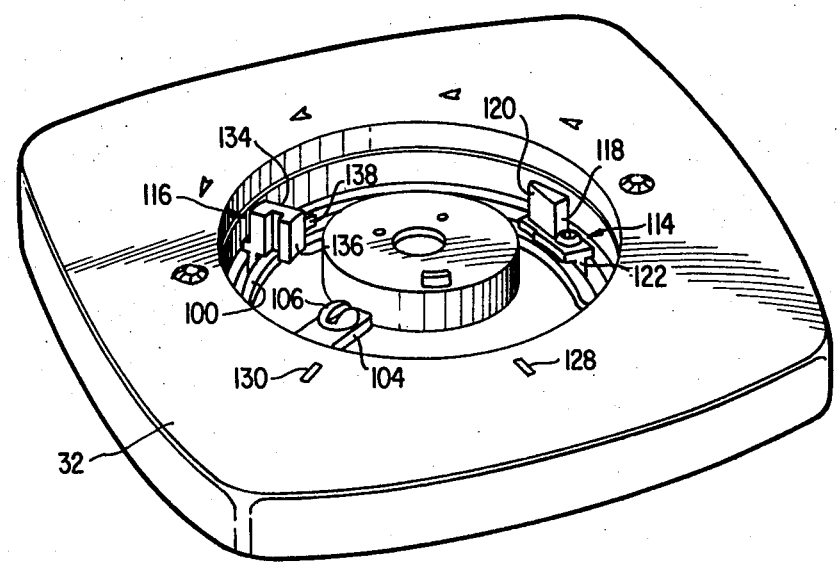
FIG. 13 is a perspective view of the cover plate and stop assembly of FIG. 12.

The location of the comfort stop is adjustable. This feature is best seen in FIG. 13 wherein the comfort stop 114 is mounted atop a movable base 122 having a downwardly extending leg which extends into the slot 102 of the slotted ring member 100. A bolt and nut assembly 124,126 secures the comfort stop in its desired rotational position between a full off location 128 and a full on location 130 in FIGS. 12-16. An Allen wrench 132 is insertable through aperture 96 in the abutment or control member 92 and insertable into the hexagonal head of bolt 124 to effect the desired rotational adjustment.

The safety stop 116 also has a flat leading and face at 134. However, this flat leading end face extends radially inwardly sufficiently far so that it is impossible for the abutment or control member 92 to clear it even when the spring 90 is fully depressed. Thus the side 136 is straight and not tapered since there is no need to return the abutment 92 to operative position. The body of the safety stop may be cut out to make it lighter and to use less material. As in the case of the comfort stop 114, the safety stop 116 is adjustable in its rotational position. To that end and as best seen in FIG. 13, stop 116 is also mounted atop a movable base 138 which also has a leg extending into the slotted portion 102 of the slotted ring member 100. In most instances, the safety stop 116 would be set at the factory by means of bolt and nut assembly 140,142 in a desired rotational positon or set at the time of the initial installation of the tub and shower.

Figure 14:
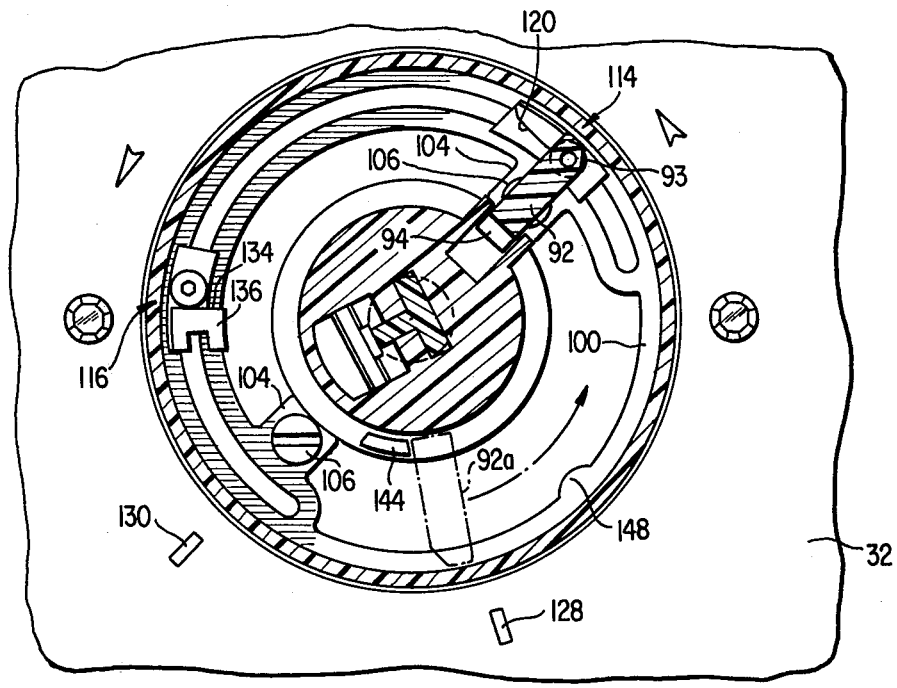
FIG. 14 is a fragmentary plan view taken in horizontal cross section along line 14—14 of FIG. 3 illustrating one position of a temperature control knob.
Figure 15:
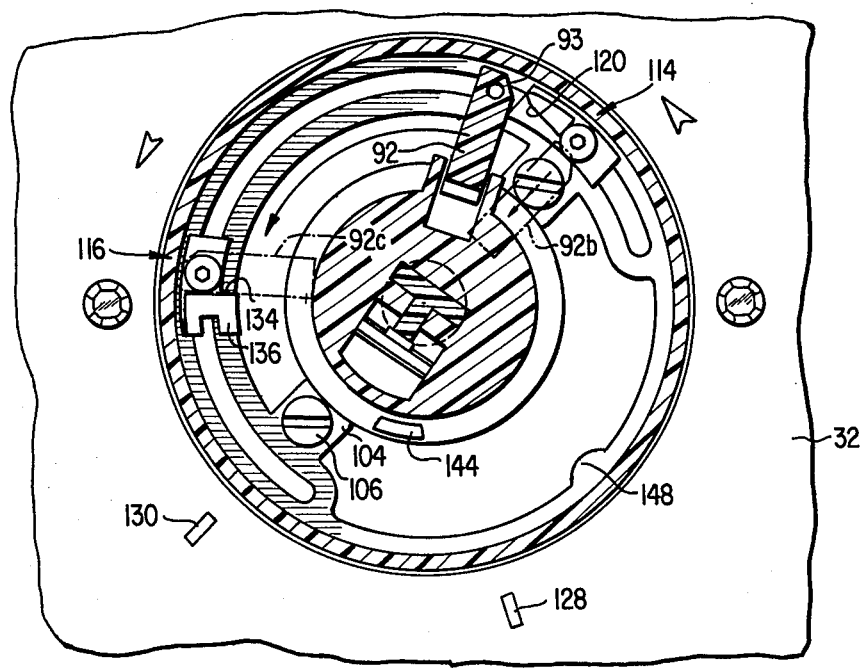
FIG. 15 is a plan view taken in horizontal cross section, similar to FIG. 14, but illustrating another position of the temperature control knob.

FIGS. 14 and 15 illustrate a number of progressive positions in the operation of the abutment or control member 92. In FIG. 14 a phantom position is illustrated at 92a adjacent a full off stop 144 on cover plate 32. The handle is rotated in a counterclockwise direction thereby progressively increasing the temperature of the water until abutment 92 engages the comfort stop 114 as shown in the full line position of FIG. 14. The temperature of the water at this location is such as to provide a comfortable tub and shower temperature for the user of approximately 105° F. If the user deliberately wishes to have a hotter water output, he pushes or depresses abutment 92 overcoming spring 90 as the abutment moves to the phantom position shown at 92b in FIG. 15. The handle 80, therefore, may be rotated further in a counterclockwise direction to a point where it completely clears the comfort stop 114 as shown in solid lines in FIG. 15 and can be continued until the abutment reaches the safety stop 116 as shown in phantom position 92c in FIG. 15. At this location, the water temperature is approximately 115° F. to prevent scalding. The output of the control valves per degree of rotation is schematically illustrated in FIG. 19.

In order to shut off the water output from either the tub or shower, the handle 80 is rotated clockwise. Abutment 92 leaves the position at 92c, reaches the comfort stop 114 at which point camming surface 93 engages tapering surface 120. Continued clockwise rotation of handle 80 effects radial inward flexure of spring 90 and abutment 92 until the latter clears the leading flat surface 118 of comfort stop 114 at which point the abutment 91 springs forwardly into its comfort position. The handle 80 may then be rotated clockwise to its full off position.

The anti-scald apparatus of the present invention is replete with means for orienting parts to be certain that they are assembled in proper position and orientation. For example, a small protrusion 146 is illustrated on cover plate 32 for securing proper orientation with respect to the slotted ring member 100 which is provided with a mating indentation at 148.

Reference to FIG. 4 illustrates a number of other orienting features. For example, valve cartridge 34 has upstanding lugs 150, 152 of different widths to insure proper assembly. An off-center positioning of lug 154 and another lug nut, not shown, insures only one positioning of the cartridge housing member 36 vis-a-vis valve cartridge 34. Cartridge housing member 36 has slots at 156,158 as does cartridge cam retainer member 76 at 160,162 to obtain proper orientation with respect to the hot and cold water valves. The jewel-like inserts 164 are indicators of water temperature in relation to handle rotation.

Figure 6:
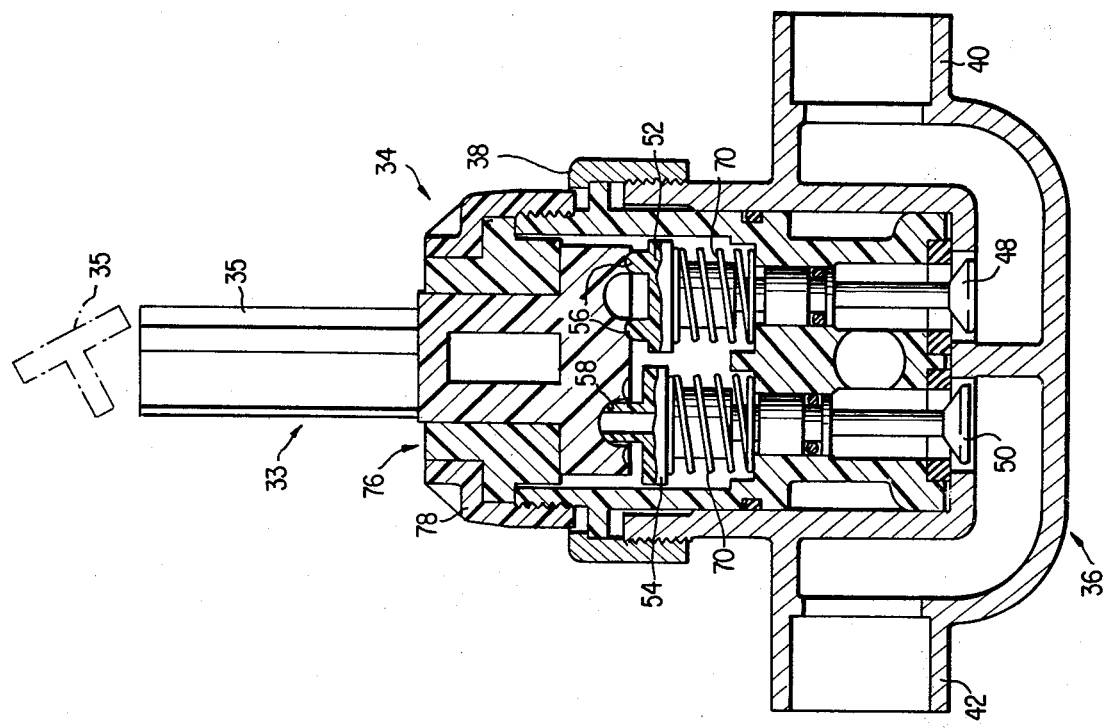
FIGS. 6–9 are elevational views taken in vertical cross section of the valve cartridge unit of FIG. 5 together with a housing therefor illustrating different positions of the control stem.
Figure 7:
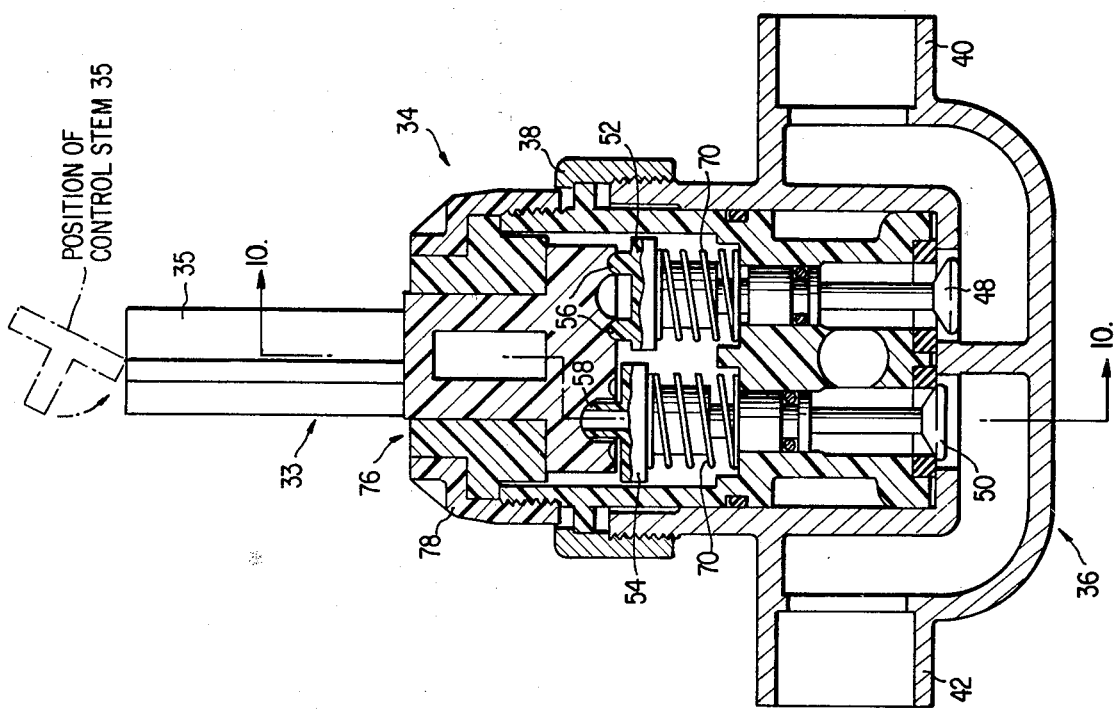
Figure 9:
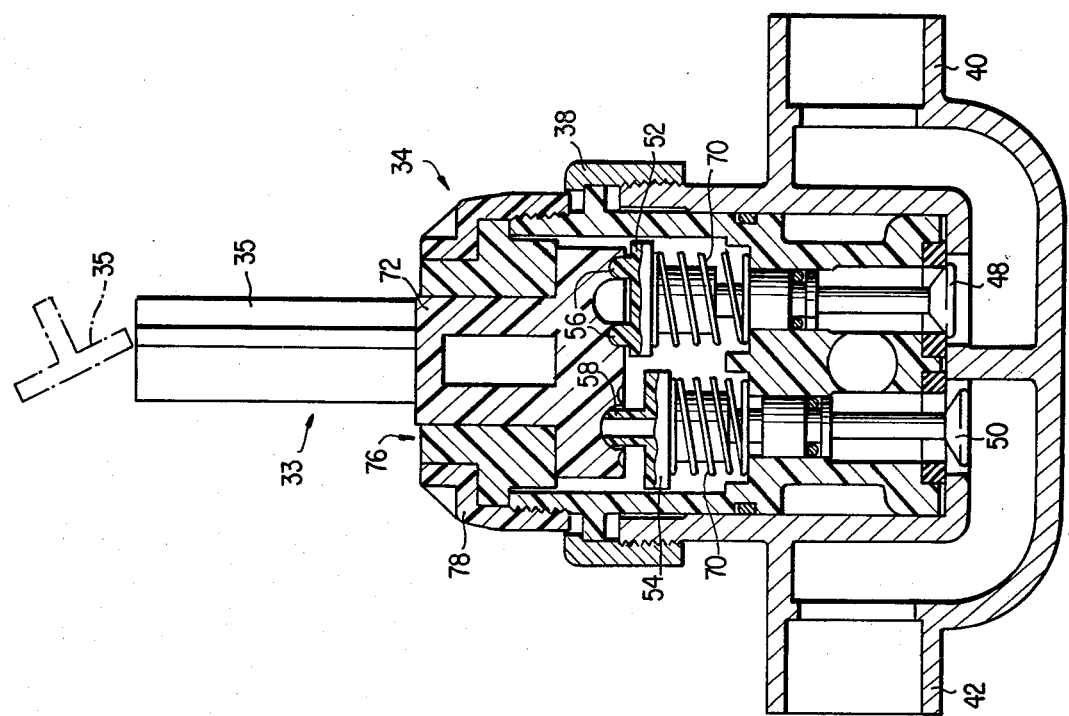
Figure 8:
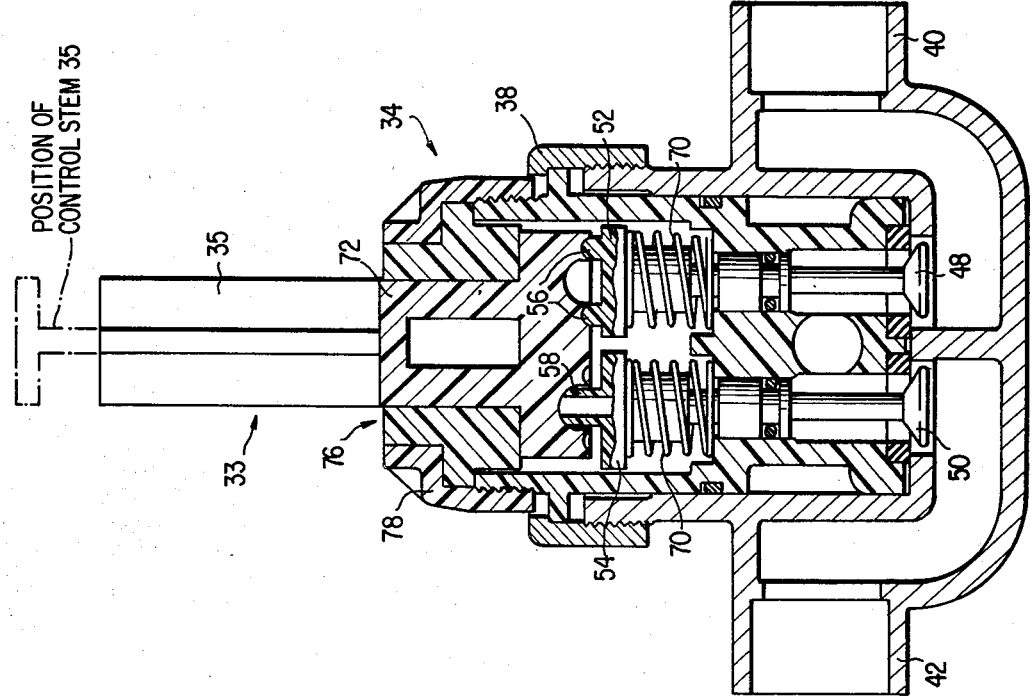
Figure 11:
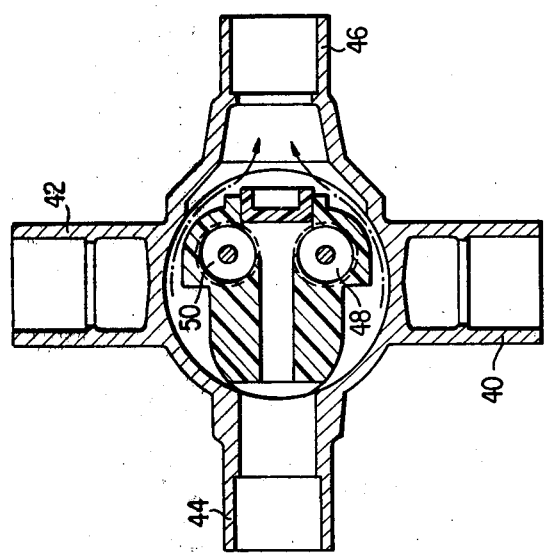
FIG. 11 is a plan view taken in horizontal cross section along line 11—11 of FIG. 10.
Figure 10:
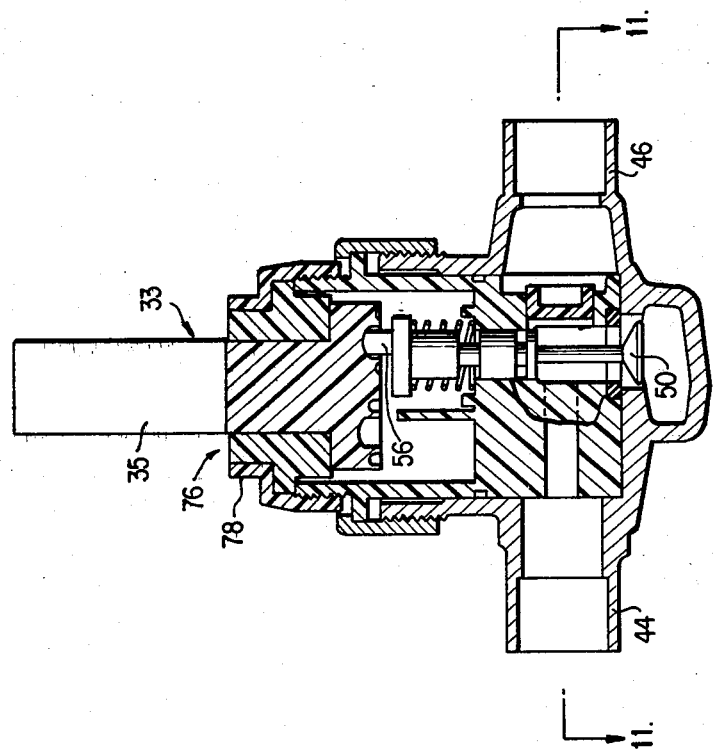
FIG. 10 is an elevational view taken in vertical cross section along line 10—10 of FIG. 6.
Figure 12:
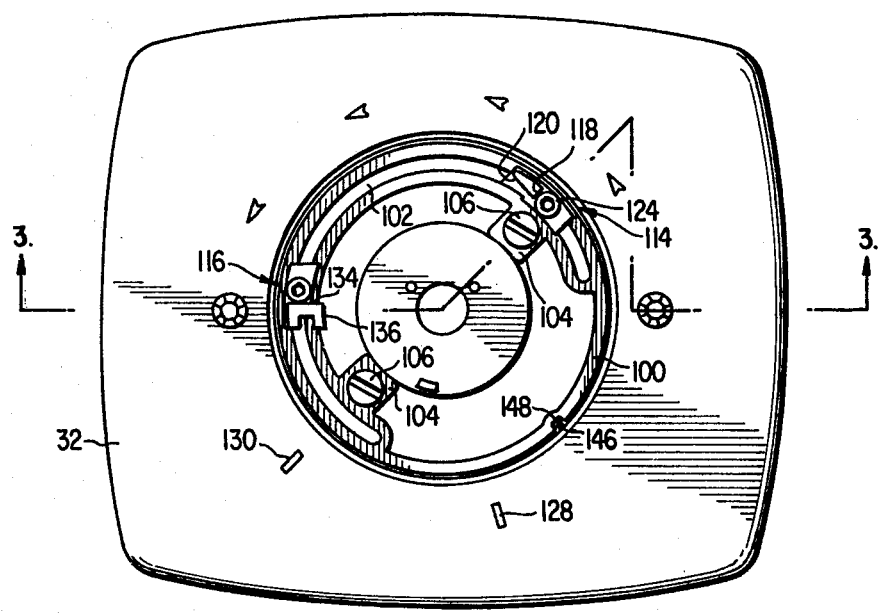
FIG. 12 is a top plan view of the cover plate and stop assembly of FIG. 3 with parts removed.

Reference is made to FIGS. 5-9 to illustrate various positions of the cold and hot water valve means 48,50. Thus, FIG. 5 illustrates the position of the valves with both valves closed. Initially only the cold valve 48 is open with the hot valve 50 shut and this is illustrated in FIG. 6. A tepid water output condition is reached in FIG. 7 with the cold valve 48 remaining open and the hot valve 50 just beginning to open. The comfort setting is illustrated in FIG. 8 with both valves open an incremental amount depending upon the pre-setting of the comfort stop 114. In FIG. 9, a maximum hot water position is illustrated with the cold water valve substantially fully closed and the hot water valve 50 substantially fully open.

If desired, the slotted ring member 100 may be provided with one or more pairs of snapping ear members which extend through mating slots in cover plate 32 thereby securing the ring member 100 to the cover plate 32. Other means of securement may also be used.

Where back-to-back installations are made and in order to use the same counterclockwise handle rotation, the use of a T-type of piping on the hot and cold supply pipes makes it possible to have the cold water supply being connected to the hot water connection side of the valve and the hot water supply being connected to the cold water connection side of the valve.

While presently preferred embodiments of the invention have been illustrated and described, it will be recognized that the invention may be otherwise variously embodied and practiced within the scope of the claims which follow.

What is claimed is:

1. An anti-scald apparatus for a tub and shower single control faucet which comprises
   a. separate hot and cold water valve means,
   b. a single control handle faucet means for opening and closing said hot and cold water valve means, c. cam means controlled by said control handle faucet means, said control handle faucet means being rotatable through substantially more than 180 degrees,
d. cam follower means carried by said hot and cold water valve means engageable with said cam means,
e. an abutment means rotatable with said control handle faucet means,
f. and a comfort stop engageable by said abutment means to provide a comfortable tub and shower temperature for the user of said tub and shower,
g. said abutment means comprises a control member carried by said control handle faucet means,
h. said control member being movable so as to clear said comfort stop permitting a further rotation of said control handle faucet means,
i. said anti-scald apparatus further having a safety stop engageable with said abutment means after said abutment means passes said comfort stop,
j. and including means to adjust the position of said comfort stop thereby varying the temperature of the water of said tub and shower when said abutment means engages said comfort stop.

2. An anti-scald apparatus as defined in claim 1 wherein said control member is provided with aperture means permitting the insertion of a tool therethrough to adjust the position of said comfort stop.

3. In a control handle for use in blending the outputs of hot and cold valve means, the improvement which comprises
   a. a cam track having substantially concentric cam track paths,
   b. cam follower means associated with said hot and cold valve means respectively whereby said control handle can be rotated substantially more than 180 degrees in effecting blending of the outputs of said hot and cold valve means,
   c. and wherein the cam track for one of said cam followers comprises a pair of tracks each generally concentric with the cam track for the other of said cam followers.

4. In a control handle as defined in claim 3 the further improvement in which one of said pair of cam tracks is positioned radially outwardly from the cam track for the other of said cam followers and the second of said pair of cam tracks is positioned radially inwardly from the cam track for the other of said cam followers.

5. In a control handle for use in blending the outputs of hot and cold valve means, the improvement which comprises:
   a. said hot and cold valve means being mounted in side-by-side relationship,
   b. a cam track having substantially concentric cam track paths,
   c. cam follower means associated with said hot and cold valve means respectively whereby said control handle can be rotated substantially more than 180 degrees in effecting blending of the outputs of said hot and cold valve means,
   d. and wherein the cam track for one of said cam followers comprises a pair of tracks each generally concentric with the cam track for the other of said cam followers.

6. In a control handle as defined in claim 5 the further improvement in which one of said pair of cam tracks is positioned radially outwardly from the cam track for the other of said cam followers and the second of said pair of cam tracks is positioned radially inwardly from the cam track for the other of said cam followers.

7. An anti-scald apparatus for a tub and shower single control faucet which comprises
   a. a cartridge housing member having separate tubular inlets for hot and cold water and outlet passageways leading to said tub and shower respectively,
   b. a cartridge member received within said cartridge housing member, said cartridge member having
      (1) hot and cold water valve means received therewithin,
      (2) passageways communicating with said hot and cold tubular inlets and with said outlet passageways leading to said tub and shower,
      (3) cam follower means mounted respectively on said hot and cold water valve means,
   c. a single control handle faucet means for opening and closing said hot and cold water valve means,
   d. cam means controlled by said control handle faucet means, said control handle faucet means being rotatable through substantially more than 180 degrees,
   e. said cam follower means being engageable with said cam means,
   f. an abutment means rotatable with said control handle faucet means,
   g. and a comfort stop engageable by said abutment means to provide a comfortable tub and shower temperature for the user of said tub and shower,
   h. said abutment means comprising a control member carried by said control handle faucet means, said control member being movable so as to clear said comfort stop permitting a further rotation of said control handle faucet means,
   i. said anti-scald apparatus further having a safety stop engageable with said abutment means after said abutment means passes said comfort stop, and
   j. including means to adjust the position of said comfort stop thereby varying the temperature of the water of said tub and shower faucet when said abutment means engages said comfort stop.

8. An anti-scald apparatus as defined in claim 7 wherein said control member is provided with aperture means permitting the insertion of a tool therethrough to adjust the position of said comfort stop.

* * * * *